(12) United States Patent
Holleczek et al.

(10) Patent No.: US 11,520,011 B2
(45) Date of Patent: Dec. 6, 2022

(54) OPTICAL ASSEMBLY FOR A LIDAR SYSTEM, LIDAR SYSTEM AND WORKING APPARATUS

(71) Applicant: Robert Bosch GmbH, Stuttgart (DE)

(72) Inventors: Annemarie Holleczek, Stuttgart (DE);
Jan Sparbert, Rutesheim (DE);
Siegwart Bogatscher, Leonberg (DE);
Stefan Spiessberger, Weinstadt (DE);
Tobias Peterseim, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 415 days.

(21) Appl. No.: 16/639,822

(22) PCT Filed: Aug. 3, 2018

(86) PCT No.: PCT/EP2018/071124
§ 371 (c)(1),
(2) Date: Feb. 18, 2020

(87) PCT Pub. No.: WO2019/038062
PCT Pub. Date: Feb. 28, 2019

(65) Prior Publication Data
US 2020/0249319 A1 Aug. 6, 2020

(30) Foreign Application Priority Data
Aug. 23, 2017 (DE) .......................... 102017214705.9

(51) Int. Cl.
*G01S 7/481* (2006.01)
*G01S 17/931* (2020.01)

(52) U.S. Cl.
CPC .......... *G01S 7/4812* (2013.01); *G01S 7/4817* (2013.01); *G01S 17/931* (2020.01)

(58) Field of Classification Search
CPC .... G01S 7/4812; G01S 7/4817; G01S 17/931; G01S 7/4815; G02B 5/005; G02B 26/10
See application file for complete search history.

(56) References Cited

U.S. PATENT DOCUMENTS

| 2008/0316463 | A1* | 12/2008 | Okada ............... G02B 26/0816 356/4.01 |
| 2014/0111812 | A1* | 4/2014 | Baeg ...................... G01S 17/87 356/610 |
| 2015/0055117 | A1* | 2/2015 | Pennecot .............. G01S 7/4813 356/4.01 |

FOREIGN PATENT DOCUMENTS

| JP | 2004170965 A | 6/2004 |
| JP | 2011027709 A | 2/2011 |
| KR | 20170051663 A | 5/2017 |

OTHER PUBLICATIONS

International Search Report for PCT/EP2018/071124, dated Nov. 8, 2018.

* cited by examiner

*Primary Examiner* — Peter D Nolan
*Assistant Examiner* — Ashley L Redhead, Jr.
(74) *Attorney, Agent, or Firm* — Norton Rose Fulbright US LLP; Gerard Messina

(57) ABSTRACT

An optical assembly for a LiDAR system is described. The optical assembly includes receiver optics and transmitter optics, designed to include partially coaxial beam paths; a line light source having a line orientation, which is configured, in particular within the range of a field of view of the underlying LiDAR system; and a deflection unit in a transition region from a common coaxial region to a separate biaxial region of the beam paths of the receiver optics and of the transmitter optics for biaxially splitting off a detector-side portion of the beam path of the receiver optics. The deflection unit has a hole mirror having an elongated hole (Continued)

that has a greater extent in a direction of longitudinal extent and a lesser extent in a direction of transverse extent. The direction of longitudinal extent of the elongated hole is oriented orthogonally to the line orientation of the line light source.

11 Claims, 9 Drawing Sheets

OPTICAL ASSEMBLY FOR A LIDAR SYSTEM, LIDAR SYSTEM AND WORKING APPARATUS

FIELD

The present invention relates to an optical assembly for a LiDAR system, a LiDAR system as such, as well as to a working apparatus and, in particular a vehicle.

BACKGROUND INFORMATION

In the use of working apparatuses, vehicles, and other machines and systems, operational assistance systems or sensor arrays are increasingly used to detect the operating environment. Besides radar-based systems or ultrasound-based systems, light-based detection systems, what are generally referred to as LiDAR (light detection and ranging) systems, for example, are increasingly being used.

It is a disadvantage of conventional LiDAR systems and the optical assemblies thereof that, in the case of coaxial beam paths of the transmitter optics and the receiver optics on the beam output side, respectively the beam input side, beam splitters are usually used, which, in the case of line illumination, result in an enlarged installation space of the LiDAR system, in a decreased receive aperture and/or in a reduction in the beam diameter upon exit of the beam.

SUMMARY

An optical assembly for a LiDAR system in accordance with the present invention, in the case of line illumination without enlargement of the installation space, a line illumination beam may be emitted without any reduction in the receive aperture in the context of a large beam diameter at the beam exit of the LiDAR system. In accordance with the present invention, this may be achieved by providing an optical assembly for a LiDAR system which is designed to include (i) a receiver optics and a transmitter optics, which feature partially coaxial beam paths; (ii) a line light source having a line orientation, the line orientation being configured, in particular in a field of view of the underlying LiDAR system; and (iii) a deflection unit as a beam splitter unit in a transition region from a common coaxial region,—in particular on a beam exit side of the transmitter optics, respectively on a beam entry side of the receiver optics—to a separate biaxial region of the beam paths of the receiver optics and the transmitter optics—in particular on a detector side or on a source side—for biaxially splitting off a detector-side portion of the beam path of the receiver optics.

In accordance with the present invention, the deflection unit has a hole mirror having an elongated hole that has a greater extent in a direction of longitudinal extent and a lesser extent in a direction of transverse extent, in particular for passage of primary light from the linear light source. Furthermore, in accordance with the present invention, the direction of longitudinal extent of the elongated hole is oriented orthogonally to the line orientation of the underlying line light source.

In connection with the present invention, the deflection unit may also be synonymously referred to as a deflection unit, a beam splitter unit, or as a beam splitter.

In connection with the present invention, what is commonly known as the laser line is preferably first produced with the desired quality at some distance from the light source unit and after passing through the region that includes the deflection unit, namely, with the line orientation defined by the light source unit and further realized by the deflection unit.

Preferred example embodiments of the present invention are described herein.

In a preferred embodiment of the optical assembly according to the present invention for a LiDAR system, the longitudinal extent and the transverse extent of the particular deflection unit are suitably set in relation to each other and/or in relation to the apertures and the further geometric properties of the transmitter optics and the receiver optics.

It is thereby provided, in particular that the ratio of longitudinal extent to transverse extent of the deflection unit at least have the value 2:1, preferably at least 3:1, and more preferably at least 4:1.

In another additional or alternative embodiment of the optical assembly according to the present invention for a LiDAR system, the ratio of a diameter of the aperture of the beam path of the receiver optics or of the longitudinal extent of the deflection unit relative to the aperture of the beam path of the receiver optics has a value within the range of from approximately 1:14 to approximately 1:7.

With regard to the embodiment of the deflection unit and the selection of the suitable geometry for the elongated hole, various geometric forms are suited, as are those that are adapted to the particular use and the geometries of the receiver optics and of the transmitter optics.

Thus, in accordance with a preferred embodiment of the optical assembly according to the present invention for a LiDAR system, the elongated hole of the deflection unit, in a plan view thereof, has a rectangular shape, a biconvex elliptical shape, a biconcave shape or a double meniscus shape.

In another advantageous embodiment of the optical assembly according to the present invention for a LiDAR system, the transmitter optics and the receiver optics are configured to include beam paths, which are at least partially or sectionally, mutually coaxially disposed on the beam exit side of the transmitter optics and/or on the beam entry side of the receiver optics.

In this context, it is especially beneficial when the deflection unit forms at least partially or sectionally biaxial beam paths on the side of the light source unit of the transmitter optics and on the side of a detector array of the receiver optics.

To achieve an especially compact design of the optical assembly according to the present invention, another advantageous embodiment provides that the receiver optics have a beam path that is folded numerous times, in particular by two or three secondary mirrors, including a first secondary mirror on an input side, which is part of the deflection unit or forms the same, including one or a plurality of secondary mirrors as concave mirrors, and/or including one of the secondary mirrors as a type of reflective bandpass filter, in particular in planar form.

The present invention also relates to a LiDAR system for optically detecting a field of view, in particular for a working apparatus and/or a vehicle. The LiDAR system is designed to include an optical assembly according to the present invention.

Moreover, the present invention relates to a working apparatus and, in particular to a vehicle that is designed to include a LiDAR system according to the present invention and for optically detecting a field of view.

BRIEF DESCRIPTION OF THE DRAWINGS

Specific embodiments of the present invention are described in detail herein with reference to the figures.

DETAILED DESCRIPTION OF EXAMPLE EMBODIMENTS

Figure 1:
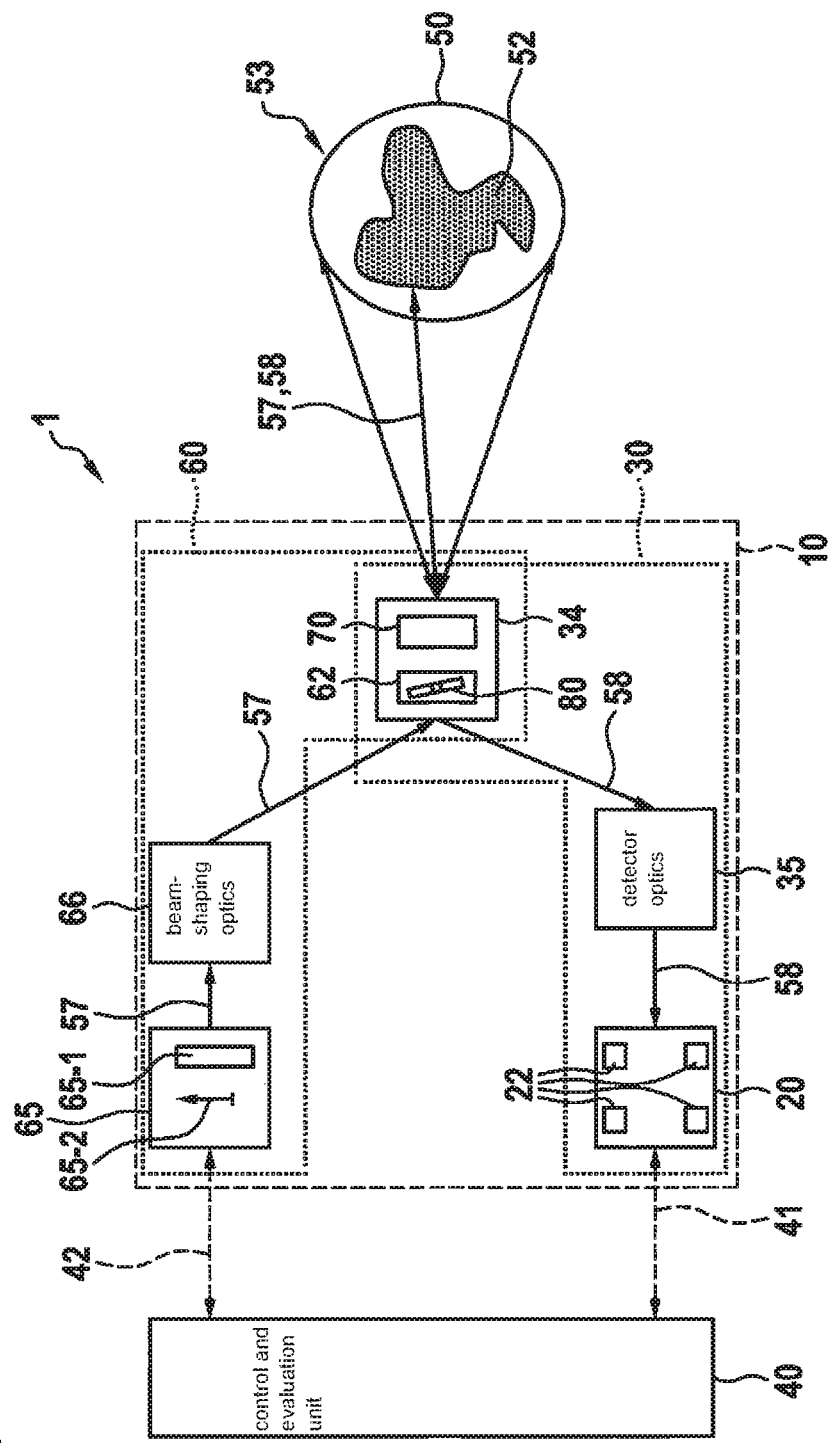
FIG. 1 is a block diagram which schematically shows a specific embodiment of the optical assembly according to the present invention in connection with a specific embodiment of a LiDAR system according to the present invention.

Exemplary embodiments and the technical background of the present invention are described in detail in the following with reference to FIG. 1 through 10. The same reference numerals denote identical and equivalent, as well as same or functionally equivalent elements and components. The designated elements and components are not described in detail in every instance thereof.

The illustrated features and further properties may be isolated from one another in any form and arbitrarily combined with one another without departing from the spirit and scope of the present invention.

In the form of a schematic block diagram, FIG. 1 shows a specific embodiment of LiDAR system 1 according to the present invention on the basis of a specific embodiment of optical assembly 10 according to the present invention.

LiDAR system 1 according to FIG. 1 has a transmitter optics 60, which is fed by a light source unit 65, for example, which has a laser as a line light source 65-1 having a line orientation 65-2 and which generates primary light 57, and radiates the same—optionally, once it has propagated through a beam-shaping optics 66—into a field of view 50 for detecting and/or analyzing a scene 53 and an object 52 located therein.

Moreover, LiDAR system 1 in accordance with FIG. 1 has a receiver optics 30, which receives light and, in particular light reflected from object 52 in field of view 50, as secondary light 58 via an objective lens 34, as primary optics, and transmits the same via a detector optics 35, as secondary optics, to a detector array 20 having detector elements or sensor elements 22.

Light source unit 65, as well as detector array 20 are controlled by a control and evaluation unit 40 via control lines 42, respectively 41.

The common deflection optics 62 on the field-of-view side may be understood to be part of a primary optics 34 of receiver optics 30 and features the inventive embodiment of optical assembly 10 that includes a corresponding deflection unit 80, which is shown purely schematically in FIG. 1.

An aperture optics 70 is optionally and advantageously provided on the field-of-view side for suitably outputting primary light 57 and for the bundling reception of secondary light 58.

Detector array 20 may be designed to include one or a plurality of sensor elements 22, which may also be configured in accordance with line orientation 65-2 of line light source 65-1 in the manner of a line detector.

Optical assembly 10 is designed for a LiDAR system 1 for optically detecting a field of view 50, in particular for a working apparatus, a vehicle or the like, and to include a transmitter optics 60 for sending a transmitted light signal into field of view 50, to include a detector array 20, and a receiver optics 30 for optically projecting field of view 50 onto detector array 20.

Receiver optics 30 and transmitter optics 60 are configured on the field-of-view side to have essentially coaxial optical axes and feature a common deflection optics 62.

On the detector side, receiver optics 30 has a secondary optics 35 which is designed for inherently directing incident light from field of view 50 via deflection optics 62 onto detector array 20 and includes means therefor.

In the case of optical assembly 10, transmitter optics 60 has a general design and means for transmitting primary light 57 into field of view 50.

Moreover, in the case of optical assembly 10, receiver optics 30 is designed for optically projecting field of view 50 onto detector array 20 and includes means therefor.

Figure 2:
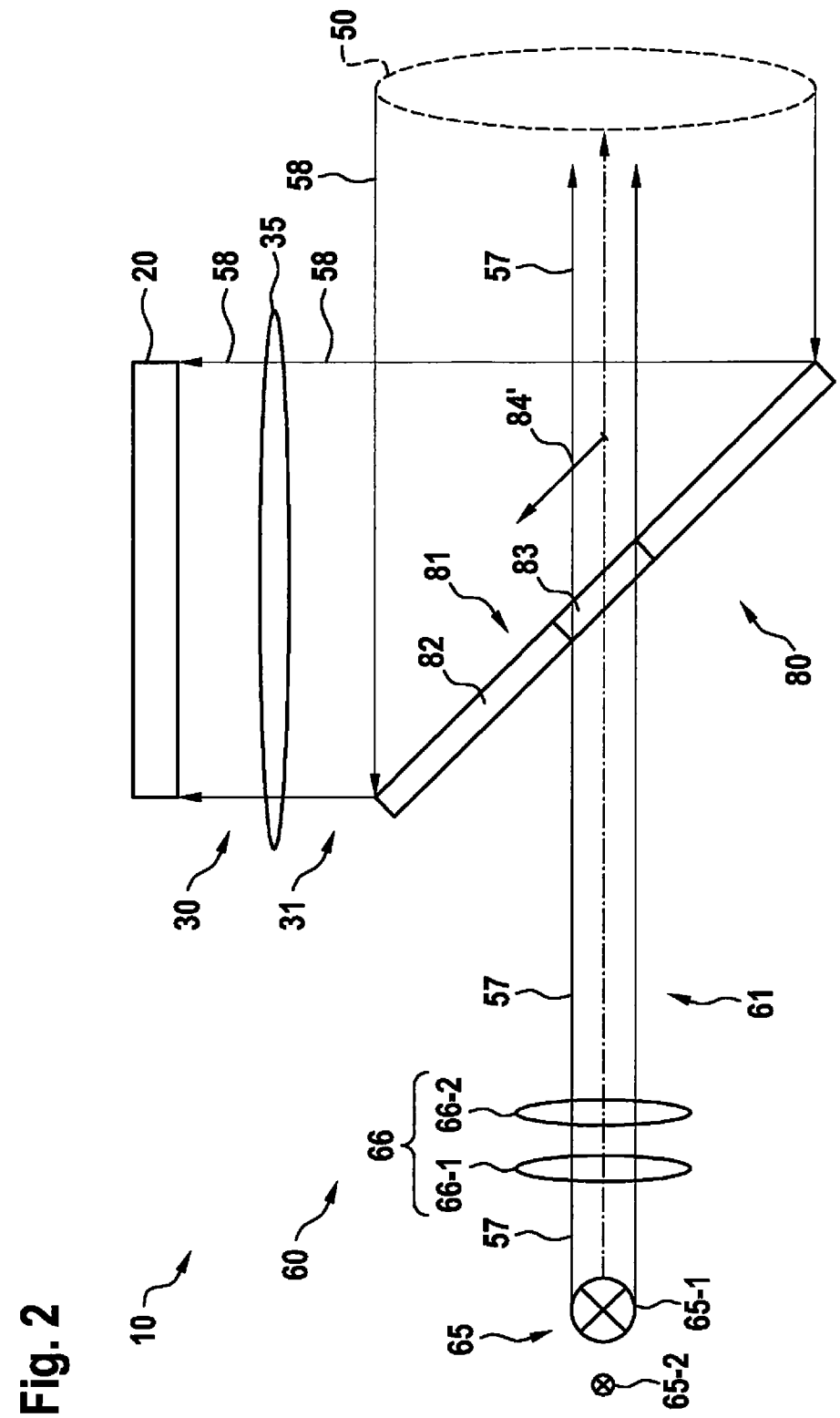
FIG. 2 through 4 show schematic and part-sectional side views of a specific embodiment of the optical assembly according to the present invention for a LiDAR system which is designed in accordance with the present invention and includes a deflection unit having a hole mirror that has an elongated hole.
Figure 3:
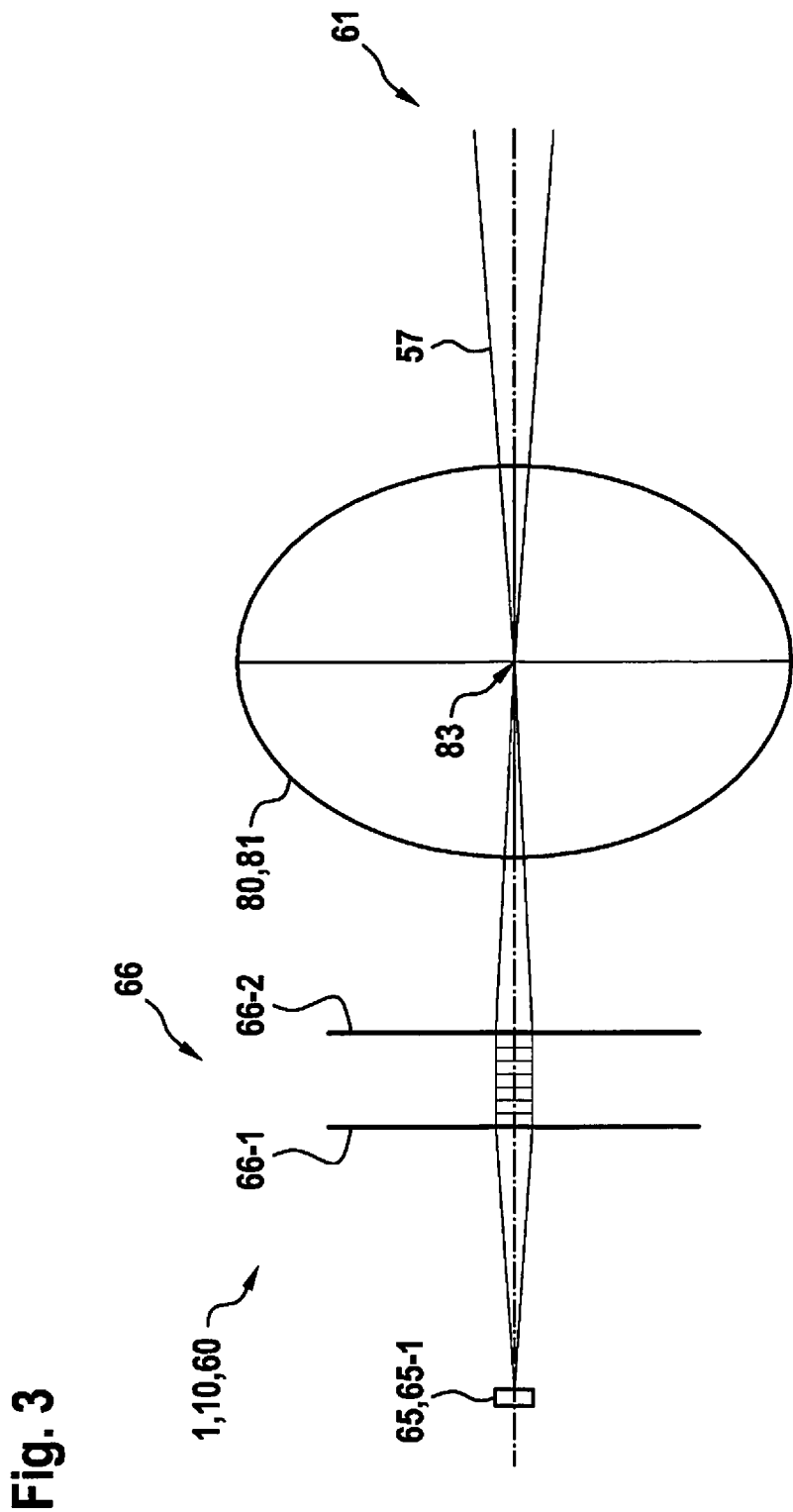
Figure 4:
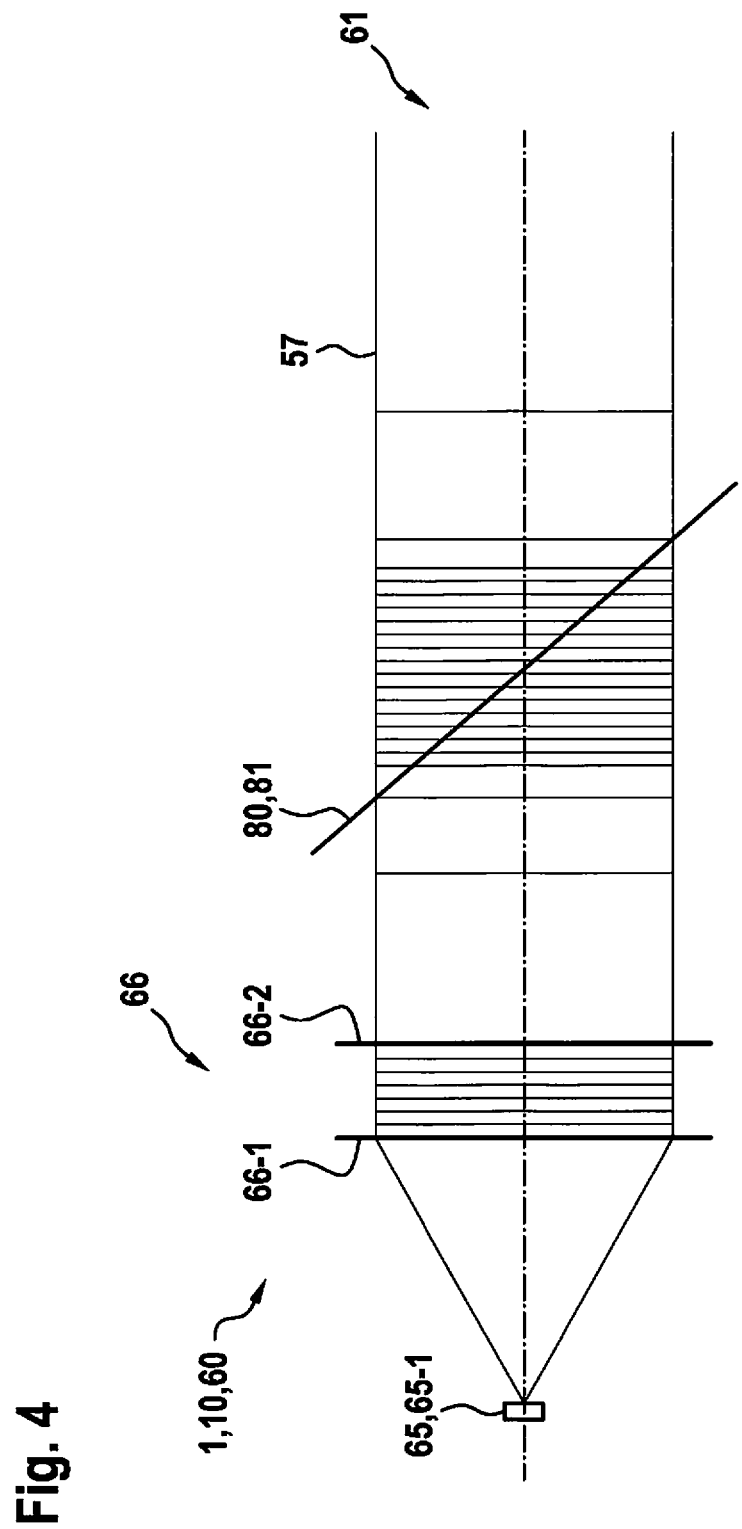

FIG. 2 through 4 show schematic and part-sectional side views of a specific embodiment of optical assembly 10 according to the present invention for a LiDAR system 1 that is designed in accordance with the present invention and includes a deflection unit 80 having a hole mirror 81 having an elongated hole 83.

Transmitter optics 60 having corresponding beam path 61 includes a light source unit 65 having a line light source 65-1, for example, in the form of a line laser having a line orientation 65-2 which is oriented into the drawing plane, for example, in the array shown in FIG. 2. Disposed downstream in beam path 61 of transmitter optics 60 is a beam-shaping optics 66 having a first collimating optics 66-1 and a second collimating optics 66-2.

In optical assembly 10 shown in FIG. 2, primary light 57 generated and emitted during operation by line light source 65-1 is directed at deflection unit 80 having a hole mirror 81 that includes a mirror body 83 and an elongated hole 83 so that primary light 57 passes through elongated hole 83. The beam of primary light 57 passes through elongated hole 83, thus is transmitted by the same, the beam properties not being changed, however. Accordingly, primary light 57 is preferably focused at the plane of elongated hole 83. This is shown purely schematically in the figures.

Following passage thereof through deflection unit 80, primary light 57 continues the propagation thereof along the then coaxial beam paths 31 and 61 for receiver optics 30 and transmitter optics 60, and ultimately exits optical assembly 10 in the direction of field of view 50 (shown here only schematically).

Receiver optics 30, including beam path 31 thereof, receives secondary light 58 from field of view 50 via the relatively large surface area of mirror body 82 of hole mirror 81 of deflection unit 80.

Deflection unit 80 is inclined in such a way that the portion of beam path 31 of receiver optics 30 associated with a detector array 20 and facing away from field of view 50, is orthogonally oriented to beam path 61 of transmitter optics 60 and to the portion of beam path 31 of receiver optics 30 facing field of view 50.

Secondary light 58 is projected onto detector array 20 by a secondary optics 35, which may also be referred to as a detector optics, and is fed to a verification.

Figure 5:
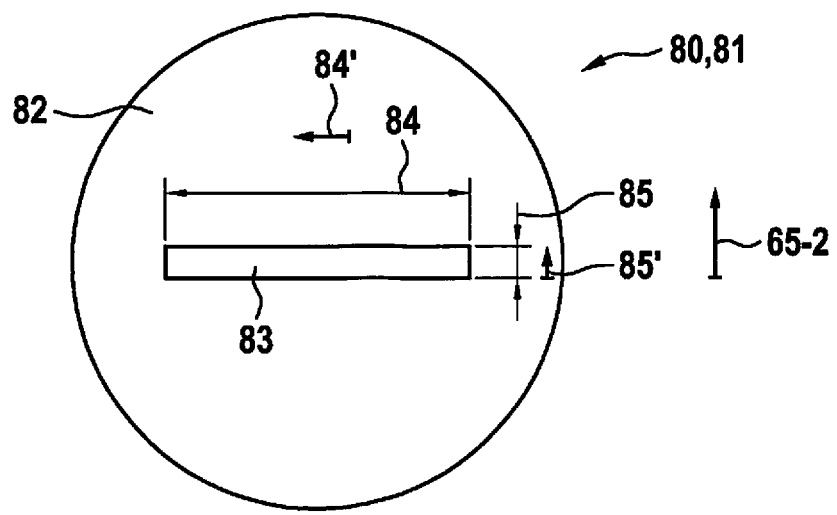
FIG. 5 through 7 show schematic plan views of deflection units that may be used in specific embodiments of the optical assembly according to the present invention for a LiDAR system.
Figure 6:
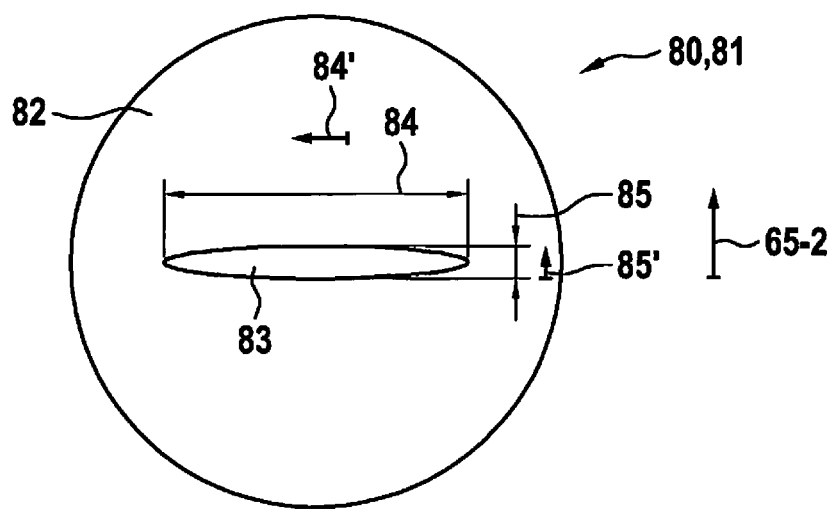
Figure 7:
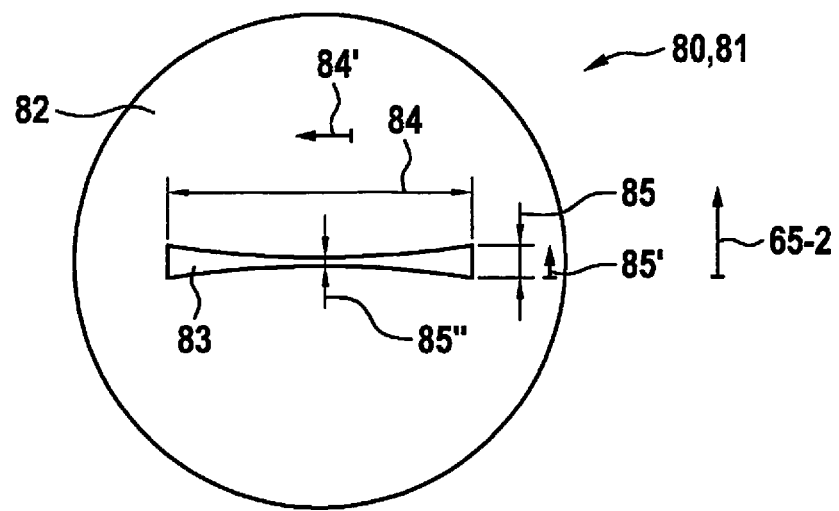

FIG. 5 through 7 show schematic plan views of deflection units 80 that may be used in specific embodiments of optical assembly 10 according to the present invention for a LiDAR system 1.

In the specific embodiments of FIG. 5 through 7, deflection unit 80 has a hole mirror 81 in each case that includes mirror body 82 and elongated hole 83. Each elongated hole 83 has a longitudinal extent 84 in a direction of longitudinal extent 84' and a transverse extent 85 in a direction of transverse extent 85'. Transverse extent 85 is smaller than longitudinal extent 84, so that hole 83 in mirror body 82 appears as an elongated hole, a gap or a slot. A respective direction of longitudinal extent 84' is configured orthogonally to line orientation 65-2 of underlying line light source 65-1. In the case of FIG. 5 through 7, directions of transverse extent 85' are configured orthogonally to direction of longitudinal extent 84' and parallel to line orientation 65-2.

Elongated hole 83 of the specific embodiment of deflection unit 80 in accordance with FIG. 5 has a rectangular shape. The long edge of the rectangle is thereby oriented parallel to direction of longitudinal extent 84'. The short edge of the rectangle is oriented parallel to direction of transverse extent 85'.

Elongated hole 83 of the specific embodiment of deflection unit 80 in accordance with FIG. 6 has an elliptical shape, the orientation of the large half-axis being parallel to direction of longitudinal extent 84'. The small half-axis of the ellipse is oriented parallel to direction of transverse extent 85'.

In a plan view, elongated hole 83 of the specific embodiment of deflection unit 80 in accordance with FIG. 7 has a double concave or double meniscus shape. This means that, at the ends of elongated hole 83, transverse extent 85 is greater than direction of transverse extent 85" in a central portion of elongated hole 83.

Figure 8:
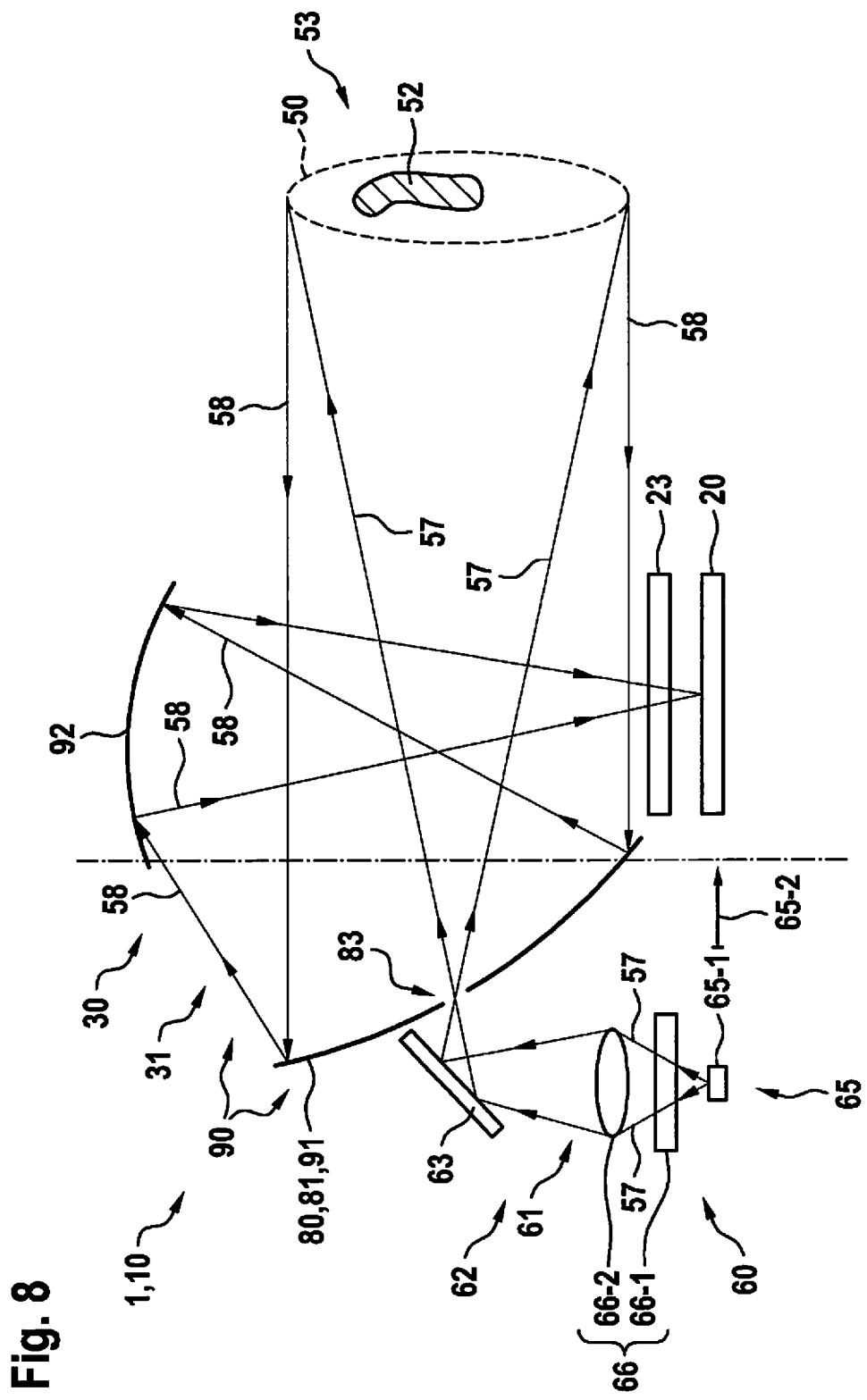
FIG. 8 through 10 show schematic and part-sectional side views of inventive LiDAR systems having a folded receiver optics.
Figure 9:
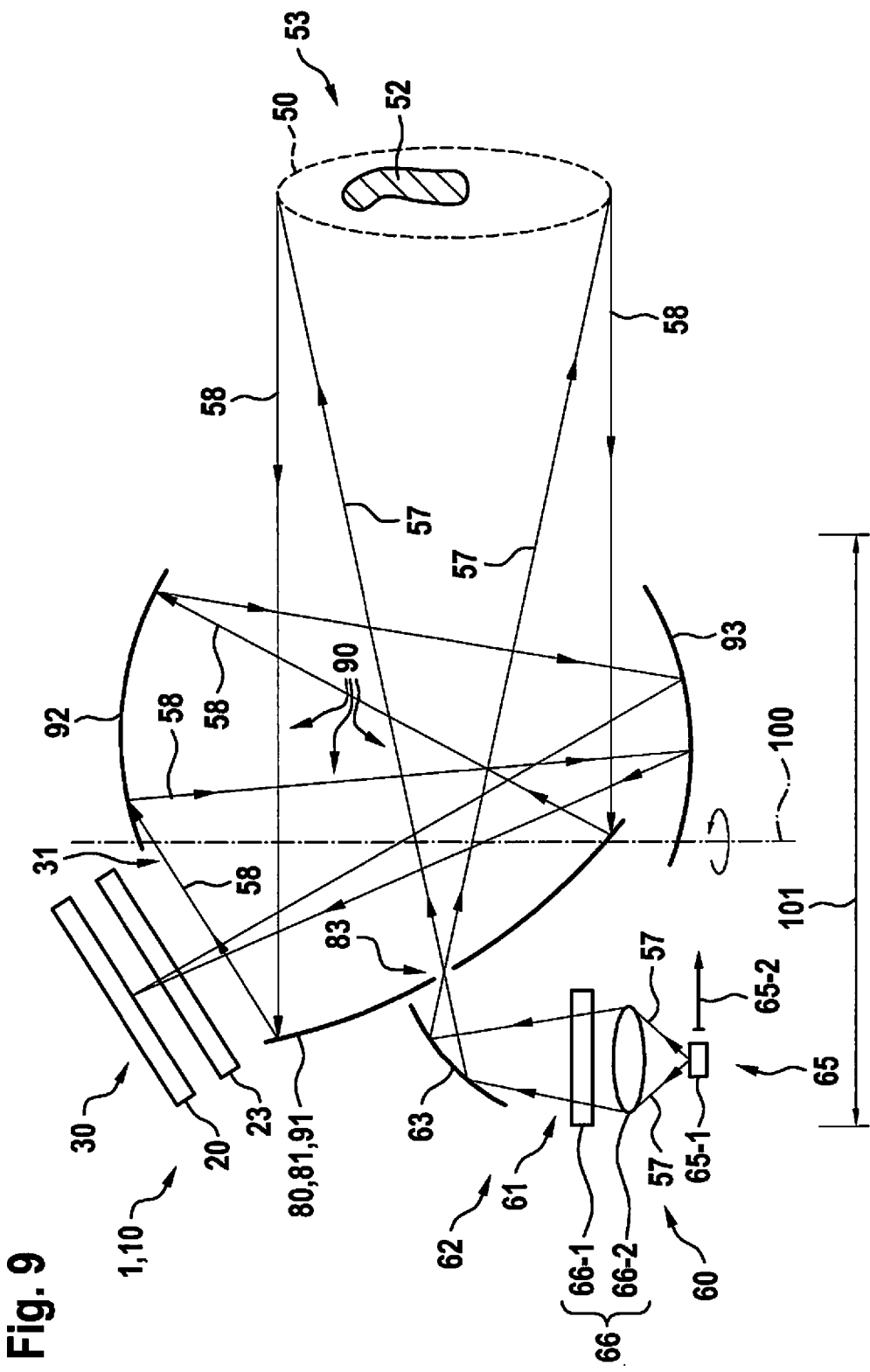
Figure 10:
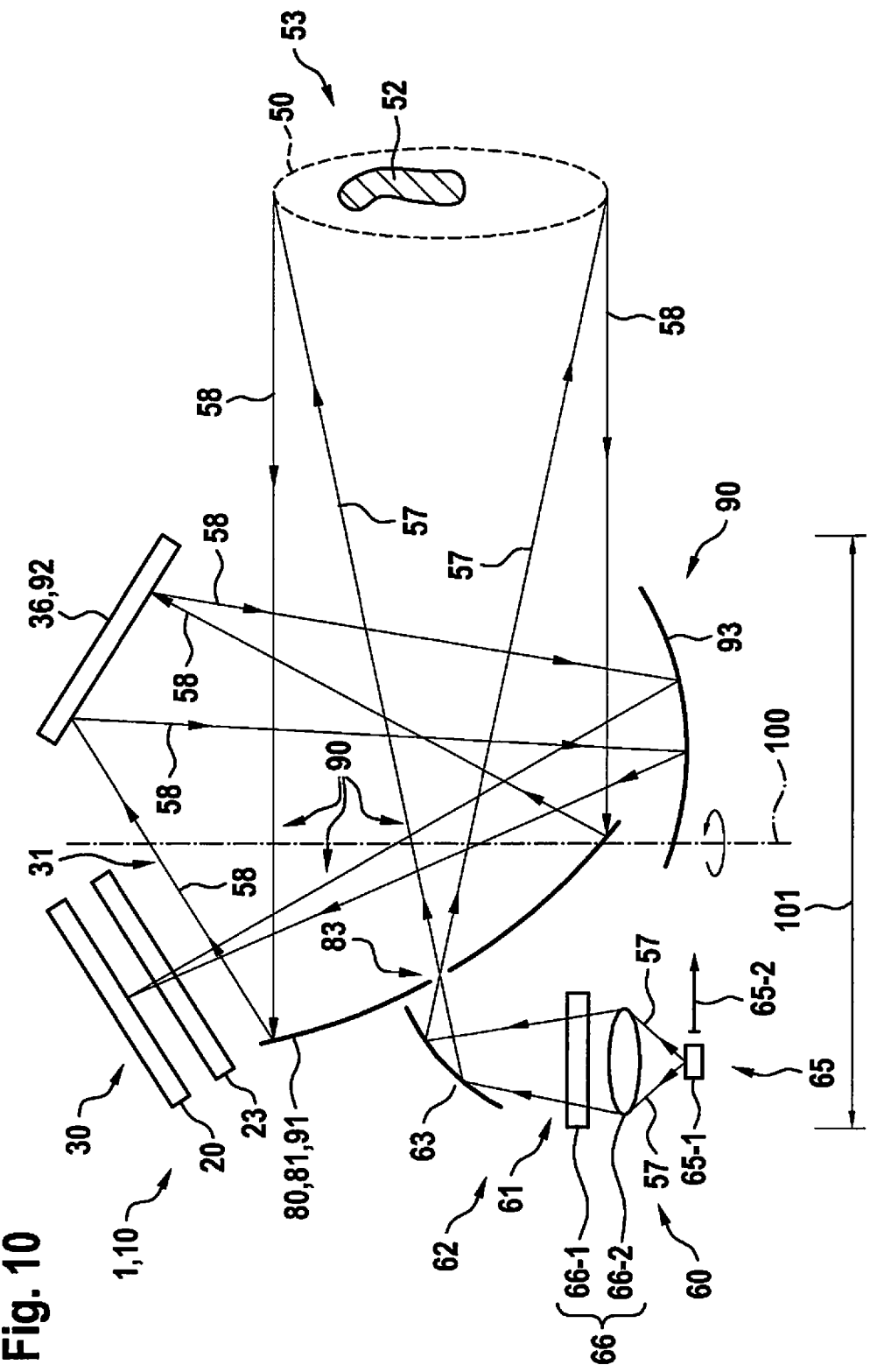

FIG. 8 through 10 show schematic and part-sectional side views of inventive LiDAR systems 1 having folded receiver optics 30.

In the specific embodiments in accordance with FIG. 8 through 10, respective beam paths 31 of receiver optics 30 are in folded form, namely, through the use of at least two secondary mirrors 91, 92 in the specific embodiment in accordance with FIG. 8 and preferably three secondary mirrors 91, 92, 93 in the specific embodiments in accordance with FIGS. 9 and 10.

A respective secondary mirror 91, which is first relative to the light entry side and the light exit side, simultaneously constitutes deflection unit 80 in the sense of the present invention and is designed as hole mirror 81 having an elongated hole 83. Elongated hole 83 is thereby designed for the passage and beam shaping of primary light 57 to transmit the same into field of view 50 to illuminate scene 53 and object 52 contained therein.

Primary light 57 is generated in each case by a line light source 65-1 having line orientation 5 and 60-2 as part of a light source unit 65 and via a beam-shaping optics 66 having a first collimating optics 66-1 and a second collimating optics 66-2, as well as directed via a mirror 63 of a deflection optics 62 toward elongated hole 83 of hole mirror 81, i.e., deflection unit 80 as first secondary mirror 91.

Entire optical assembly 10 of LiDAR system 1 according to the present invention is rotatable by a corresponding mechanism about an axis of rotation 100 and thereby has diameter 101 that is effective during rotation.

Besides first secondary mirror 91, receiver optics 30 having beam path 31 in the case of optical assembly 10 in accordance with FIG. 8 has a second secondary mirror 92, which receives secondary light 58 from first secondary mirror 91 and directs the same for passage through a filter 23 to detector array 20. In this specific embodiment, first and second secondary mirrors 91 and 92 are designed as concave mirrors.

Besides first secondary mirror 91, receiver optics 30 having beam path 31 in the case of optical assembly 10 in accordance with FIG. 9, has second and third secondary mirrors 92, respectively 93 in the form of concave mirrors. Second secondary mirror 92 receives secondary light 58 from first secondary mirror 91 and transmits it to third secondary mirror 93, which, in turn, provides for projecting secondary light 58 to pass through filter 23 to detector array 20.

The structure of receiver optics 30 having beam path 31 in optical assembly 10 in accordance with FIG. 10 is analogous to that of the assembly from FIG. 9; second concave secondary mirror 92 being replaced by a planar bandpass filter 36, however.

In accordance with FIG. 8 through 10, in the specific embodiments of the inventive LiDAR system, the focus of the mirror or of micromirror 63 and, therefore, the focus of the beam of primary light 57 resides in the plane of respective hole 83 of hole mirror 81, as secondary mirror 91 of deflection unit 80, which functions as a beam splitter unit. This is schematically shown in FIG. 8 through 10.

These and other features and properties of the present invention are clarified in greater detail with reference to the following explanations:

In a LiDAR system 1, the spatial resolution may be realized by the simultaneous or sequential illumination of a relatively large portion, for example, of a line, and a receiving-side differentiation on the basis of an imaging optics and a detector array or a detector line.

Output-side and input-side, mutually coaxial variants may thereby be constructed in an especially space-saving and cost-effective manner, where output-side transmit path 61 and input-side receive path 31 partly coincide.

Coaxial configurations, as also presented in accordance with the present invention, are based, on the one hand, on the provision of a beam splitter 80 and, on the other hand, on the embodiment thereof that includes a hole mirror 81, as shown schematically in connection with FIG. 2 through 7.

In the case of hole mirrors 81, an aperture 83 in a mirror body 82 is used for the transmit beam, as primary light 57, to pass through, and for receiving a signal reflected from the surrounding area in the sense of secondary light 58 via the remaining mirror surface of mirror body 82. This is also shown schematically in FIG. 2 through 7.

In this regard, a collimated laser beam is emitted as primary light 57, for example. It is generally beneficial for a large beam diameter to be transmitted, since this is advantageous for eye safety considerations and, moreover, makes possible fewer beam divergences in the context of an existing beam quality. Moreover, it is desirable to have as much surface area as possible for detecting light 58 reflected off of the target or object 52, to obtain a sufficiently high signal intensity at large measuring distances.

It is contradictory for conventional assemblies of LiDAR systems to combine these two requirements in such a way, since emitting a larger beam decreases the receive aperture.

Described at this point in accordance with the present invention is a procedure for emitting a line illumination seam. (flash line or line flash) via an aperture 83 in a mirror 81, as beam splitter 80, when working with a coaxial LiDAR system 1 that does not thereby substantially reduce the receive aperture and, at the same time, that does ensure a large beam diameter at the exit surface of the system.

Accordingly, the main features of the present invention are:
- designing a coaxial LiDAR system 1;
- forming an image of a line, namely by collimating a beam, as primary light in a first direction orthogonally to the propagation direction and by shaping it to diverge in a second direction, orthogonally to the propagation direction and, in particular also orthogonally to the first direction;
- guiding the laser beam as primary light 57 through an aperture 83 in a receiving mirror, as beam splitter 80, in the form of a hole mirror 81;
- focusing the divergent axis at the gap or in the vicinity of the gap as mirror hole 83 of hole mirror 81, in particular at the or at a or in a or into the narrow side of aperture 83 in mirror body 82;
- collimating the non-divergent axis in accordance with the long side of aperture 83 of mirror body 82;
- forming the long side of aperture 83 of mirror body 82 to be larger at least by a factor of two in comparison to the narrow side of aperture 83 of mirror body 82; and/or
- achieving a rotation of the line in the far field in comparison to the orientation of the gap formed by mirror hole 83 in mirror body 82 deflection unit 80.

Advantages derived include, inter alia:
- A coaxial laser system having small dimensions may be used, it being possible for a substantial portion of the device aperture to be employed for detecting signals.
- At the location of the beam exit, the transmitted beam, as primary light 57, already has a large beam diameter, which is important for eye safety.
- In this instance, the collimated beam likewise has a large beam diameter, making it possible for a low-divergent beam to be emitted.

FIG. 2 shows the basic design.

The beam emitted as primary light 57 from the laser as light source 65-1 of light source unit 65, is shaped by suitable optics, in particular a beam-shaping optics 66, for example, using two cylindrical lenses 66-1, 66-2 or a symmetrical lens. The beam emitted from laser 65-1 is thereby shaped in the axis, which later constitutes the narrow side of the line, in a way that results in a slight divergence, as depicted in connection with FIG. 4.

Especially advantageous in this context is collimating the beam of primary light 57. The divergence of the beam of primary light 57 thereby depends on the beam diameter, thus on the minimum beam diameter, also referred to as beam waist, and on the quality of beam 57.

The larger the beam diameter is, the smaller is the divergence.

Very small divergences are typically sought, whereby a large beam diameter is advantageous in this spatial direction. In the other spatial direction, the beam should have a relatively large divergence so that, at a certain distance from the LiDAR system, a line light distribution or an illumination in the manner of a line results.

In accordance with the present invention, this divergence is generated via an intermediate focus, which resides in the vicinity of aperture 83 of mirror 81, as is shown in connection with FIG. 3.

As already mentioned, mirror 81 has an aperture 83 in mirror body 82, which is wider or longer at least by a factor of two than it is high (beam 57 is collimated in this axis); the focus of the divergent axis is here.

As primary light 57, the emitted beam thereby passes through aperture 83 of mirror body 82 of hole mirror 81, as a beam splitter 80, without being influenced by the mirror. Merely the received beam is deflected as secondary light 58 by the mirror surface of mirror body 82 at an imaging optics (objective lens) and detector array 20.

In a preferred variant of LiDAR system 1 according to the present invention, no further optics, which significantly change the beam, are situated between the deflection mirror, as beam splitter 80, and the exit surface of system 1.

Specific computation example:

It is assumed that the diameter of a circular receive aperture is 25 mm. This would yield a total area of 491 mm$^2$. In the case of a line illumination, the gap for purposes of emission needs to be merely 15 mm×1 mm, thus 15 mm$^2$. Consequently, merely a fraction of the available device aperture, namely approximately 3% is not used as a receiving area and approximately 97% is available therefor.

At the exit surface of LiDAR system 1, a beam exit surface results, which, in the first approximation, is important for eye safety, and is composed of the diameter of the collimated axis and that of the divergent axis. The diameter of the collimated axis is somewhat smaller than the diameter of aperture 83. The beam diameter of the divergent axis is slightly determined by the dimensions of aperture 83 and essentially by the beam divergence and the distance of the mirror aperture to the beam exit out of system 1.

At a beam divergence of 15° and a distance from mirror aperture 83 to the beam exit of 50 mm, a beam diameter of at least 13 mm is obtained, for example.

This value would already be very beneficial in the context of an eye safety assessment since a standard pupil of 7 mm is assumed—rays can be simultaneously incident within this range.

To produce an image of the surroundings, the complete system or a beam-deflecting optics is ultimately rotated.

The following alternative specific embodiments are possible and may also be arbitrarily combined:
- Aperture 83, thus the mirror hole, of body 82 of hole mirror 81, as deflection element 80, may assume any shape, for example, the shape of a rectangle, of an ellipse, or a free-form shape, as is shown schematically in connection with FIG. 5 through 7. An outwardly higher shape is especially advantageous in order to compensate for the greater distance to the focal point at the edge regions.
- A mirror, as a deflection unit 80, may have a plurality of apertures 83 at different locations.
- Prior to the exit thereof out of the LiDAR system, the beam of primary light 57 may be deflected and/or folded a plurality of times. This is schematically shown in connection with FIG. 8 through 10.
- The aperture could be located in an optical system.
- A plurality of individual laser emitters, as light sources 65-1 of light source unit 65, may also be used, for example, in the form of laser bars.
- In this case, the beams of individual lasers 65-1 overlap at the location of aperture 83, which likewise corresponds to a focusing.
- A provided mirror may feature a curvature, which may be used on the receiving side for beam shaping.

In an alternative perspective of the present invention, the object underlying the present invention is to provide a space-saving design for a rotating, coaxial LiDAR sensor, that will permit a greatest possible beam expansion of transmit beam 57 to enhance the transmit power in terms of eye safety.

A difference in comparison to the assemblies described above is the focusing at the receive path.

In accordance with this alternative perspective, essential features of the present invention are listed below and may occur in any combination:

providing a coaxial LiDAR system 1;
forming an image of a line, i.e., of a transmit beam 57, which is collimated in one direction and is divergent in one direction;
guiding a laser beam as transmit beam 57 through an aperture 83 in a receiving mirror 81, as deflection unit 80;
focusing the divergent axis at or in the vicinity of the gap, namely of the narrow side of aperture 83 in mirror body 82 of hole mirror 81 as deflection unit 80;
collimating the non-divergent axis to the long side of aperture 83 of mirror body 82 of hole mirror 81;
configuring the long side or longitudinal extent 84 to be greater by at least a factor of two than the narrow side or transverse extent 85;
the rotated orientation of the line of line light source 65-1 in the far field relative to orientation 84' of the gap or of aperture 83 of mirror body 82 of hole mirror 81;
a curvature of mirror 81, which represents the receive aperture and includes aperture 83; and/or
a superimpose folding of receive beam path 31 to save additional space through the use of a plurality of curved mirrors.

The following inventive advantages are derived:

Mirror 81, which represents the receive aperture and includes aperture 83, is curved. This eliminates the need for a lens.

Space is saved by the multiple beam folding of receive beam path 31, as well as by the overlapping of transmit beam 57 and receive beam 58 in the same installation volume.

Weight is reduced by the use of mirror optics. This enhances pedestrian protection and reduces the demands on the motor of the scanner of LiDAR system 1.

A cost-effective production is possible since the free-form mirrors may be manufactured as injection-molded components and, in some cases, a plurality of mirrors may be combined into one component.

Furthermore, is possible to reduce the number of adjustment steps by combining a plurality of mirrors in one component.

It is possible to economize on lens holders by combining mirrors with the rotor housing.

A maximum beam expansion is achieved by shifting the slot from the center point of rotation, in particular in comparison to the specific embodiment described above in connection with FIG. 2 through 7.

In accordance with this alternative perspective, the basic design of the present invention is shown in FIG. 8. Except for the deflection mirror, as deflection unit 80, in transmit path 61, transmit optics 60, as well as the laser, as light source 65-1, are identical to the specific embodiments described above from FIG. 2 through 7.

A characteristic of the first mirror of receive path 31 is that it contains at least one slot-shaped aperture and is curved. At this point, receive path 31 is folded within a compact volume through the use of a plurality of curved mirrors and is ultimately focused at or imaged onto detector array 20. An optical bandpass filter is located either directly upstream of detector array 20—providing the advantage of a smaller filter area—or upstream of the first receive mirror, providing namely the advantage of a small angle of incidence in the case of low aperture numbers of receive optics 30.

FIG. 8 is a schematic representation of a specific embodiment of the present invention, transmit beam path 61 being shown as a solid line and receive beam path 31 as a dash-dot line. With regard to receive beam 58, only the horizontal beam is shown for the sake of better clarity.

Transmit optics terms: slow axis collimator (SAC), fast axis collimator (FAC).

FIG. 9 shows another specific embodiment where three curved mirrors are used in receive path 31.

An advantage of this specific embodiment is the increased number of degrees of design freedom to compensate for aberrations in receive beam path 31.

Thus, FIG. 9 is a schematic representation of a second specific embodiment of the present invention, transmit beam path 61 being shown as a solid line and receive beam path 31 as a dash-dot line.

The essential distinction from the assembly of FIG. 8 is that receive beam 58 is folded by three curved receive mirrors, increasing the number of degrees of freedom to compensate for aberrations without increasing the amount of space.

Alternatively, one of the mirrors may also be replaced by a reflective bandpass filter, as schematically shown in FIG. 10.

FIG. 10 is a schematic representation of another specific embodiment of the present invention, transmit beam path 61 being shown as a solid line and receive beam path as a dash-dot line. A distinction from the representation in FIG. 9 is that one of receive mirrors 92 is replaced by a reflective bandpass filter 36.

What is claimed is:

1. An optical assembly for a LiDAR system, comprising a receiver optics and a transmitter optics, which have partially coaxial beam paths;
a line laser configured to emit a laser beam as a laser line having a line orientation, into a field of view of the LiDAR system, the line orientation of the laser line being orthogonal to a beam path of the emitted laser beam; and
a deflection unit in a transition region from a common coaxial region to a separate biaxial region of the beam paths of the receiver optics and the transmitter optics, the deflection unit configured to biaxially split off a detector-side portion of the beam path of the receiver optics, wherein the deflection unit includes a hole mirror having an elongated hole that has a greater extent in a direction of longitudinal extent and a lesser extent in a direction of transverse extent, the direction of longitudinal extent of the elongated hole being oriented orthogonally to the line orientation of the laser line emitted by the line laser.

2. The optical assembly as recited in claim 1, wherein a ratio of the longitudinal extent of the elongated hole to transverse extent of the elongated hole is at least 2:1.

3. The optical assembly as recited in claim 1, wherein a ratio of the longitudinal extent of the elongated hole to transverse extent of the elongated hole is at least 3:1.

4. The optical assembly as recited in claim 1, wherein a ratio of the longitudinal extent of the elongated hole to transverse extent of the elongated hole is at least 4:1.

5. The optical assembly as recited in claim 1, wherein a ratio of a diameter of an aperture of the beam path of the receiver optics or of the longitudinal extent of the deflection unit to an aperture of the beam path of the receiver optics has a value within the range of from approximately 1:14 to approximately 1:7.

6. The optical assembly as recited in claim 1, in which the elongated hole of the deflection unit, in a plan view thereof, is rectangular or has a biconvex elliptical shape or has a biconcave shape or has a double meniscus shape.

7. The optical assembly as recited in claim 1, wherein:
the transmitter optics and the receiver optics are configured to include beam paths which are at least partially or sectionally, mutually coaxially disposed on a beam exit side of the transmitter optics and/or on the beam entry side of the receiver optics; and
the deflection unit forms at least partially or sectionally biaxial beam paths on a side of the line light source unit and on a side of a detector array of the receiver optics.

8. The optical assembly as recited in claim 1, wherein:
the receiver optics has a beam path that is folded numerous times by two or three secondary mirrors;
a first one of the secondary mirrors on an input side is part of the deflection unit or forms the deflection unit;
one or a plurality of the secondary mirrors is a concave mirror, and/or one of the secondary mirrors is a reflective bandpass filter in planar form.

9. The optical assembly as recited in claim 1, wherein the optical assembly is situated in a vehicle.

10. A LiDAR system for optically detecting a field of view for a working apparatus and/or a vehicle, the LiDAR system comprising:
an optical assembly including:
a receiver optics and a transmitter optics, which have partially coaxial beam paths;
a line laser configured to emit a laser beam as a laser line having a line orientation, into a field of view of the LiDAR system, the line orientation of the laser line being orthogonal to a beam path of the emitted laser beam; and
a deflection unit in a transition region from a common coaxial region to a separate biaxial region of the beam paths of the receiver optics and the transmitter optics, the deflection unit configured to biaxially split off a detector-side portion of the beam path of the receiver optics, wherein the deflection unit includes a hole mirror having an elongated hole that has a greater extent in a direction of longitudinal extent and a lesser extent in a direction of transverse extent, the direction of longitudinal extent of the elongated hole being oriented orthogonally to the line orientation of the laser line emitted by the line laser.

11. A working apparatus or a vehicle, comprising:
a LiDAR system for optically detecting a field of view for the working apparatus or the vehicle, the LiDAR system including an optical assembly, the optical assembly including:
a receiver optics and a transmitter optics, which have partially coaxial beam paths;
a line laser configured to emit a laser beam as a laser line having a line orientation, into a field of view of the LiDAR system, the line orientation of the laser line being orthogonal to a beam path of the emitter laser beam; and
a deflection unit in a transition region from a common coaxial region to a separate biaxial region of the beam paths of the receiver optics and the transmitter optics, the deflection unit configured to biaxially split off a detector-side portion of the beam path of the receiver optics, wherein the deflection unit includes a hole mirror having an elongated hole that has a greater extent in a direction of longitudinal extent and a lesser extent in a direction of transverse extent, the direction of longitudinal extent of the elongated hole being oriented orthogonally to the line orientation of the laser line emitted by the line laser.

* * * * *